United States Patent [19]

Magers et al.

[11] Patent Number: 5,127,355
[45] Date of Patent: Jul. 7, 1992

[54] FISHING ROD STORAGE COMPARTMENT FOR A BOAT

[75] Inventors: Mark S. Magers; Guy K. Long, both of Lebanon, Mo.

[73] Assignee: Outboard Marine Corporation, Waukegan, Ill.

[21] Appl. No.: 546,568

[22] Filed: Jun. 29, 1990

[51] Int. Cl.⁵ .................................. B63B 17/00
[52] U.S. Cl. ..................... 114/255; 144/144 R; 144/343
[58] Field of Search ............... 114/343, 363, 220, 255, 114/270, 144 R

[56] References Cited

U.S. PATENT DOCUMENTS

| | | |
|---|---|---|
| D. 233,140 | 10/1974 | Tanaka ........................... 114/270 |
| 3,674,170 | 7/1972 | Thorpe et al. . |
| 4,063,646 | 12/1977 | Stahl, Jr. . |
| 4,170,801 | 10/1979 | Ward . |
| 4,628,852 | 12/1986 | Nishida et al. ................... 114/270 |
| 4,706,810 | 11/1987 | Petrilli . |
| 4,736,700 | 4/1988 | Ishimatsu et al. ................ 114/270 |
| 4,827,864 | 5/1989 | LaMontange et al. . |
| 4,957,056 | 9/1990 | Martin ............................. 114/343 |
| 4,974,536 | 12/1990 | Martin ............................. 114/255 |
| 4,986,208 | 1/1991 | Kobayashi et al. ............... 114/270 |
| 4,989,532 | 2/1991 | Kishi et al. ...................... 114/270 |

Primary Examiner—Sherman D. Basinger
Assistant Examiner—Thomas J. Brahan
Attorney, Agent, or Firm—Michael, Best & Friedrich

[57] ABSTRACT

A boat including a hull having a bow end, a raised surface in the bow end, a console supported on the hull for pivotal movement between a lowered position and a raised position, an apparatus for defining a storage compartment extending beneath the console when the console is in the lowered position and extending beneath and the raised surface, and an apparatus for affording access to the storage compartment when the console is in the raised position and for preventing access to the storage compartment when the console is in the lowered position, the apparatus for affording and preventing access including a storage compartment cover supported on the console for movement therewith.

16 Claims, 1 Drawing Sheet

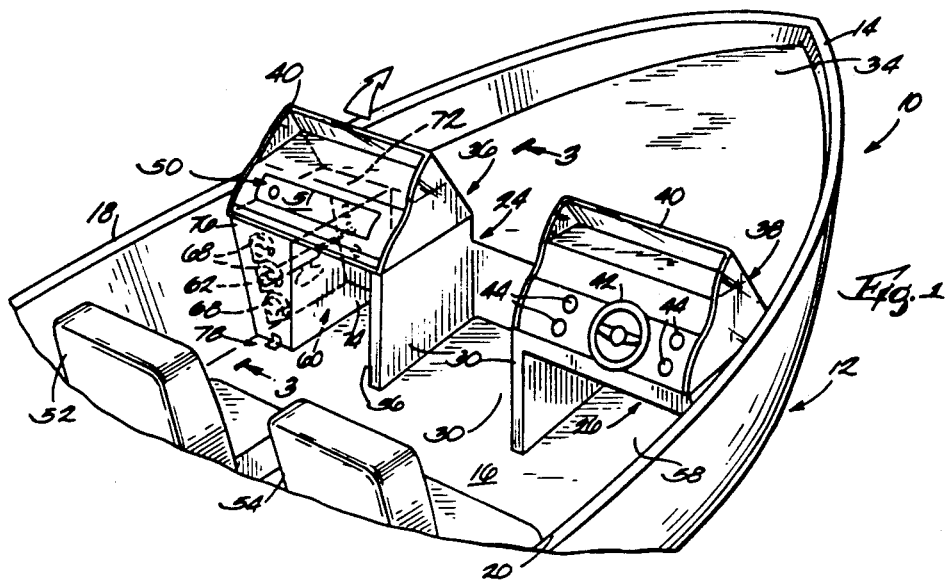

FISHING ROD STORAGE COMPARTMENT FOR A BOAT

BACKGROUND OF THE INVENTION

1. Field of the Invention

The present invention relates generally to marine craft, and more particularly to a fishing rod storage compartment incorporated into a boat such as a bass boat.

2. Reference to Prior Art

Specialized fishing craft known as "bass boats" have become popular among fisherman. The typical bass boat includes a console on which can be located various controls, indicators, or instrumentation needed to operate the boat and its accessories. The console is generally located between elevated fishing decks positioned respectively in the bow end and the stern end of the boat. Bass boats also generally include storage space or compartments for storing various types of gear.

Attention is directed to the following United States patents:

| U.S. Pat. No | Inventor | Date Issued |
| --- | --- | --- |
| 3,674,170 | Thorpe, et al. | July 4, 1972 |
| 4,063,646 | Stahl | December 20, 1977 |
| 4,170,801 | Ward | October 16, 1979 |
| 4,706,810 | Petrilli | November 17, 1987 |
| 4,827,864 | LaMontagne, et al. | May 9, 1989 |

SUMMARY OF THE INVENTION

The invention provides a boat comprising a hull, a console supported on the hull for movement between a first position and a second position, means for defining a storage compartment extending beneath the console when the console is in the first position, and means for affording access to the storage compartment when the console is in the second position and for preventing access to the storage compartment when the console is in the first position.

In one embodiment of the invention, the console is pivotally mounted on the boat hull for movement between the first and second positions, and the means for affording and preventing access includes a storage compartment cover which is supported on the console for movement therewith, and which is configured to engage the hull to enclose the storage compartment when the console is in the first position.

The invention also provides a boat comprising a hull including a bow end, a console supported on the hull for pivotal movement about a generally horizontal axis between a lowered position and a raised position, a raised surface located adjacent the bow end, means for defining a storage compartment extending beneath the console when the console is in the lowered position and extending beneath the raised surface, and means for affording access to the storage compartment when the console is in the raised position and for preventing access to the storage compartment when the console is in the lowered position, the means for affording and preventing access including a storage compartment cover supported on the console for movement therewith.

In one embodiment of the invention the storage compartment is an elongated fishing rod storage compartment including at least one tubular member which is adapted to receive a fishing rod and which extends beneath the raised surface.

The invention also provides a boat comprising a hull, a console supported on the hull for pivotal movement about a generally horizontal axis between a lowered position and a raised position, means for defining a storage compartment extending beneath the console when the console is in the lowered position, a storage compartment cover moveable between opened and closed positions for affording and preventing access to said storage compartment, and means including the storage compartment cover for supporting the console in the lowered position.

In one embodiment of the invention, the storage compartment cover includes means engageable with the console when the console is in the lowered position for restricting movement of the storage compartment cover from the closed to the opened position.

A principal feature of the invention is the provision of a boat having a moveable console and a storage compartment extending beneath the console for conveniently storing equipment, such as fishing rods, and for protecting the fishing rods against damage or theft when not in use.

Another principal feature of the invention is the provision of a boat, and specifically a fishing boat, which includes a pivotally mounted console moveable between lowered and raised positions, a fishing rod storage compartment extending beneath the console, and a storage compartment cover moveable either with the console or independently of the console for enclosing the compartment. The cover cooperates with the console to selectively and alternatively permit or restrict access to the contents of the storage compartment when the console is respectively in the raised and lowered positions.

Other features and advantages of the invention will become apparent to those skilled in the art upon review of the following detailed description, claims and drawings.

DESCRIPTION OF THE DRAWINGS

FIG. 1 is a perspective view of the bow end of a fishing boat which embodies various of the features of the invention and which shows a console in a lowered position.

FIG. 2 is a perspective view similar to FIG. 1, and showing the console in a raised position.

FIG. 3 is a view taken along line 3—3 in FIG. 1.

FIG. 4 is a view similar to FIG. 2, and showing an alternative embodiment of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Shown in FIG. 1 is the forward portion of a marine craft which is in the form of a fishing boat known as a bass boat 10, and which embodies various features of the invention. The boat 10 includes a hull 12 having a bow end 14. The hull 12 includes a floor 16, opposite left and right sidewalls 18 and 20 extending transversely from the floor 16, and a transom (not shown) located at the stern end of the boat 10 and adapted to support a marine propulsion device such as a conventional outboard motor.

The hull 12 is provided with a pair of upstanding console supports or bases 24 and 26 supported on the floor 16. The console bases 24 and 26 are preferably positioned on opposite sides of the boat 10 adjacent respective sidewalls 18 and 20. As shown best with respect to console base 24 in FIG. 2, each of the console bases 24 and 26 preferably includes a first or forward wall portion 28 which extends laterally inwardly from one of the sidewalls 18 and 20, and a second or inner side wall portion 30 extending rearwardly from the forward wall portion 28 and in generally parallel relation to the sidewalls 18 and 20. The inner side wall portions 30 of the bases 24 and 26 define therebetween a walk-through area 32 extending along the boat floor 16.

The boat 10 also includes a raised surface or deck 34 which is spaced above the floor 16 and which extends laterally between the sidewalls 18 and 20 in the bow end 14 of the boat 10. The raised deck 34 is preferably positioned forwardly of the console bases 24 and 26. The raised deck 34 is also preferably horizontally oriented and can be used as a fishing platform. A pedestal seat (not shown) can be provided on the raised deck 34 for use by a fisherman.

While in the illustrated arrangement the raised deck 34 is in the bow end 14 and extends fully between the sidewalls 18 and 20, the raised deck 34 can in other arrangements be located elsewhere in the boat 10 and can extend only partially between the sidewalls 18 and 20.

The boat 10 also includes left and right consoles 36 and 38 respectively located on console bases 24 and 26. Each of the left and right consoles 36 and 38 is provided with a windshield 40. While in the illustrated arrangement the boat 10 includes left and right consoles 36 and 38 respectively located on console bases 24 and 26 to form a pair of console assemblies, the boat 10 can in other arrangements include one or more console assemblies.

The right console 38 is preferably securely mounted on the console base 26. As shown in FIG. 1, the right console 38 includes a steering wheel 42 and various standard instruments and controls 44 used in operating the boat 10.

Means are provided for supporting the left console 36 for movement relative to the console base 24. While various supporting means can be employed, in the illustrated arrangement, the supporting means includes (see FIG. 2) a hinge 46 connected between the left console 36 and the forward wall portion 28 of the console base 24. The hinge 46 supports the left console 36 for pivotal movement about a generally horizontal axis 48 between a first or lowered position (shown in FIG. 1) and a second or raised position (shown in FIG. 2). A flexible member, such as a cord 49, is connected between the console base 24 and the left console 36 to limit upward pivotal movement of the left console 36.

The left console 36 includes a glove box 50 which has a lid 51. While in the illustrated arrangement the left console 36 includes only a glove box 50, the left console 36 can in other arrangements include various instruments such as gauges, a stereo, or a depth finder.

The boat 10 also comprises seats 52 and 54 mounted on the floor 16. The seats 52 and 54 are positioned rearwardly of and face the left and right consoles 36 and 38. The left and right consoles 36 and 38 define thereunder respective spaces 56 and 58 which provide leg room for passengers seated on seats 52 and 54.

The boat 10 is provided with means for defining a storage compartment 60. The storage compartment 60 preferably extends beneath the left console 36 when the left console 36 is in the lowered position. While various means can be employed for defining the storage compartment 60, in the illustrated arrangement, such means includes portions of each of the left sidewall 18, the floor 16, and the forward wall portion 28. While the storage compartment 60 can be adapted to accommodate various equipment, in the illustrated arrangement, the storage compartment 60 is adapted to store fishing rods 62 (only one of which is shown). Accordingly, the storage compartment 60 includes (see FIG. 3) means for receiving at least one fishing rod 62. While various receiving means can be employed, in the illustrated arrangement, such means includes hollow tubular members 64 each adapted to receive a fishing rod 62. Each of the tubular members 64 passes through the forward wall portion 28 of the console base 24 and extends forwardly of the console base 24 beneath the adjacent raised deck 34. The tubular members 64 are positioned longitudinally along the left sidewall 18 and are secured thereto via supports 66. Clamp members 68 are mounted on the left sidewall 18 beneath the left console 36 for releaseably holding fishing rods 62. Each of the tubular members 64 corresponds to one of the clamp members 68 and combines therewith to securely hold a fishing rod 62 within the storage compartment 60. This reduces the possibility of accidentally damaging the fishing rods 62 and assists in preventing the fishing rod lines from becoming entangled when the rods 62 are not in use.

The boat 10 also comprises means for affording access to the storage compartment 60 when the left console 36 is in the raised position, and for preventing access to the storage compartment 60 when the left console 36 is in the lowered position. While various means for affording and preventing access can be employed, in the illustrated arrangement, such means includes a storage compartment door or cover 70 attached to the left console 36 for movement therewith.

The storage compartment cover 70 includes a top wall 72 fixed to the underside of the left console 36, and a leg depending transversely therefrom. The leg includes a sidewall portion 74 extending in generally parallel relation to the sidewall 18, and a front wall portion 76 extending transversely from the sidewall portion 74. The storage compartment cover 70 is located beneath the left console 36 when the left console 36 is in the lowered position, and is preferably small enough so that sufficient leg room remains in the space 56 to accommodate a person sitting on the seat 52. The storage compartment cover 70 is configured to engage each of the sidewall 18, the floor 16 and the forward wall portion 28 to close the storage compartment 60 when the left console 36 is in the lowered position. When the left console 36 is in the raised position, the storage compartment cover 70 affords access to the storage compartment 60.

In the illustrated arrangement, a coventional locking hasp 78 is provided to releaseably secure both the left console 36 and the storage compartment cover 70 in the lowered position. As shown in FIG. 2, the locking hasp 78 includes a latch member 80 on the floor 16, and a hook member 82 on the front wall portion 76 of the storage compartment cover 70. When the left console 36 is in the lowered position, the latch member 80 and hook member 82 can be secured together by suitable means, such as a padlock or pin (not shown), to hold the left console 36 down.

The fishing rod storage compartment 60 is conveniently located beneath the raised deck 34 and the left console 36 to store fishing rods 62 out of the way. When the left console 36 is in the lowered position, the associated storage compartment cover 70 and the raised deck 34 conceal the fishing rods 62 and fishing lines from view to give the interior of the boat 10 a clean, uncluttered appearance.

FIG. 4 illustrates an alternative embodiment of the present invention. Except as otherwise indicated, the alternative embodiment includes the same elements as the previous embodiment and the same reference numerals are used.

In the alternative embodiment, the storage compartment cover 70 is not mounted on the console 36 for movement therewith. Instead, means are provided for supporting the storage compartment cover 70 for movement relative to the left console 36. While various supporting means can be employed, in the illustrated arrangement, such means includes a hinge 90 connected between the storage compartment cover 70 and the forward wall portion 28 of the console base 24. The hinge 90 supports the storage compartment cover 70 for pivotal movement about a generally vertical axis 92 between a closed position (shown in solid lines in FIG. 4) and an opened position (shown in broken lines in FIG. 4). Separate locking hasps (not shown) can be provided for locking the storage compartment cover 70 and the left console 36 in their respective closed and lowered positions.

The alternative embodiment also include means for supporting the left console 36 in the lowered position. While various supporting means can be employed, in the arrangement illustrated in FIG. 4, the supporting means includes the storage compartment cover 70. When the left console 36 is moved to the lowered position it engages the top wall 72 of the storage compartment cover 70 and is supported thereon.

The alternative embodiment also includes means for restricting movement of the storage compartment cover 70 when the left console 36 is in the lowered position. While various restricting means can be employed, in the illustrated arrangement, the restricting means is provided by engagement of the left console 36 with the top wall 72. When in the lowered position, the left console 36 cooperates with the storage compartment cover 70 to prevent access to the fishing rod storage compartment by bearing against the storage compartment cover 70 to frictionally restrict movement thereof. In addition, when the left console 36 is lowered it limits the available working space needed to access the contents of the fishing rod storage compartment.

When the left console 36 is in the raised position, the resistance provided by the engagement of the left console 36 with the top wall 72 is removed, allowing the storage compartment cover 70 to be easily moved between opened and closed positions. Also, ample space is afforded to access the fishing rod storage compartment 60 when the left console 36 is raised.

Various of the features of the invention are set forth in the following claims.

We claim:

1. A boat comprising a hull including a floor, a sidewall extending transversely from said floor, and an upstanding support, a console pivotally mounted on said upstanding support for movement between a first position and a second position and including a cover portion, and means for defining a storage compartment which extends beneath said console, which is formed by engagement of said cover portion with said sidewall, said floor, and said upstanding support, and which is inaccessible when said console is in said first position, and which is accessible when said console is in said second position.

2. A boat as set forth in claim 1, wherein said console is pivotable about a generally horizontal axis between said first position, which is a lowered position, and said second position, which is a raised position.

3. A boat as set forth in claim 1, wherein said boat includes a raised surface adjacent said console, and wherein said storage compartment extends beneath said raised surface.

4. A boat as set forth in claim 3, wherein said hull includes a bow end, and wherein said raised surface is located adjacent said bow end and is positioned forwardly of said console.

5. A boat comprising a hull including an upstanding support, and a deck surface extending forwardly of said upstanding surface, a console pivotally mounted on said upstanding support for movement between a first position and a second position, means for defining an elongated fishing rod storage compartment for receiving at least one fishing rod and extending beneath said deck surface and beneath said console, and means for affording access to said storage compartment when said console is in said second position and for preventing access to said storage compartment when said console is in said first position.

6. A boat comprising a hull including a forwardly located raised surface, and an upstanding support located rearwardly of said raised surface, a seat spaced rearwardly from said upstanding support and facing said upstanding support, a console pivotally mounted on said upstanding support for movement between a first position and a second position, and defining thereunder, when in said first position, a space providing leg room for a person seated on said seat, means for defining a storage compartment extending beneath said raised surface and beneath said console when said console is in said first position, and means for affording access to said storage compartment when said console is in said second position and for preventing access to said storage compartment when said console is in said first position.

7. A boat comprising a hull including a bow end, a raised surface located adjacent said bow end, a console supported on said hull for pivotal movement between a lowered position and a raised position, means including said console for defining an elongated fishing rod storage compartment which extends beneath said console beneath said raised surface and which includes at least one tubular member adapted to receive a fishing rod and extending beneath said raised surface, a storage compartment cover forming a part of said console, being movable therewith, partially defining said storage compartment, and preventing access thereto when said console is in said lowered position and permitting access to said storage compartment when in the raised position.

8. A boat as set forth in claim 7, wherein said means for defining includes said hull, and wherein said storage compartment cover is configured to engage said hull to complete said storage compartment when said console is in said lowered position.

9. A boat adapted to include a forwardly facing seat, said boat comprising a hull, a console supported on said hull forwardly of the seat for pivotal movement about a generally horizontal axis between a lowered position defining thereunder a space adapted to receive the legs of a passenger occupying the seat and a raised position, means for defining a storage compartment extending adjacent said space and adjacent and beneath said console when said console is in said lower position and spaced below said console when said console is in said raised position, a storage compartment cover moveable relative to said console and between opened and closed positions for affording and preventing access to said storage compartment, and means including said storage compartment cover for supporting said console in said lowered position.

10. A boat as set forth in claim 9, wherein said storage compartment cover includes means engageable with said console when said console is in said lowered position for restricting movement of said storage compartment cover from said closed position to said opened position.

11. A boat as set forth in claim 10, wherein said storage compartment cover includes a generally horizontal upper surface, and wherein said means for restricting includes said upper surface.

12. A boat comprising a hull, a console supported on said hull for pivotal movement about a generally horizontal axis between a lowered position and a raised position, means including said hull for defining a storage compartment extending adjacent and beneath said console when said console is in said lower position and spaced below said console when said console is in said raised position, a storage compartment cover pivotally mounted on said hull for movement about a generally vertical axis and relative to said console and between opened and closed positions for affording and preventing access to said storage compartment, and means including said storage compartment cover for supporting said console in said lowered position.

13. A boat as set forth in claim 12, wherein said boat includes a raised surface adjacent said console, and wherein said storage compartment extends beneath said raised surface.

14. A boat as set forth in claim 13, wherein said hull includes a bow end, and wherein said raised surface is located adjacent said bow end and is positioned forwardly of said console.

15. A boat as set forth in claim 13, wherein said storage compartment is an elongated fishing rod storage compartment including means extending beneath said raised surface for receiving at least one fishing rod.

16. A boat as set forth in claim 13, wherein said boat includes a seat spaced rearwardly from said console and facing said console, and wherein said console defines thereunder a space when in said lowered position, said space providing leg room for a person seated on said seat.

* * * * *